United States Patent [19]

Sakurai

[11] Patent Number: 5,056,742
[45] Date of Patent: Oct. 15, 1991

[54] MODULAR RUDDER PEDAL AND BRAKE CONTROL ASSEMBLY FOR AIRCRAFT

[75] Inventor: Seiya Sakurai, Seattle, Wash.
[73] Assignee: The Boeing Company, Seattle, Wash.
[21] Appl. No.: 418,389
[22] Filed: Oct. 6, 1989

Related U.S. Application Data

[63] Continuation-in-part of Ser. No. 120,324, Nov. 13, 1987, Pat. No. 4,848,708.

[51] Int. Cl.[5] .................. B64C 13/06; B64C 19/02
[52] U.S. Cl. ............................ 244/235; 74/478; 74/512; 74/480 R; 74/522
[58] Field of Search ............... 244/235; 74/478, 478.5, 74/512, 480 R, 522

[56] References Cited

U.S. PATENT DOCUMENTS

| | | |
|---|---|---|
| 1,222,839 | 4/1917 | Wright . |
| 1,608,611 | 11/1926 | Milburn . |
| 1,746,008 | 2/1930 | Minshall . |
| 1,774,558 | 9/1930 | Laddon et al. . |
| 1,795,910 | 3/1931 | Wait, Jr. . |
| 1,814,576 | 7/1931 | Tatter . |
| 1,844,607 | 2/1932 | Sikorsky . |
| 1,873,906 | 8/1932 | Ring et al. . |
| 1,879,859 | 9/1932 | Stinson ........................... 244/235 |
| 1,884,701 | 10/1932 | Howard . |
| 1,919,520 | 7/1933 | Laddon et al. . |
| 1,998,677 | 4/1935 | Laddon et al. . |
| 2,048,448 | 7/1936 | Hofer . |
| 2,074,730 | 3/1937 | Kerr, Jr. . |
| 2,420,528 | 5/1947 | Eaton, Jr. et al. . |
| 2,424,523 | 7/1947 | Watter . |
| 2,433,146 | 12/1947 | Odell, Jr. . |
| 2,478,546 | 8/1949 | Pickens et al. . |
| 2,516,397 | 7/1950 | Kress et al. . |
| 2,585,688 | 2/1952 | Saulnier . |
| 2,610,006 | 9/1952 | Boyce . |
| 2,669,284 | 2/1954 | Pall et al. . |
| 2,697,566 | 12/1954 | Glass . |
| 2,757,630 | 8/1956 | Ottinger . |
| 2,760,739 | 8/1956 | Reichert . |
| 2,998,211 | 8/1961 | Evans . |
| 3,027,778 | 4/1962 | Risnes . |
| 3,108,651 | 10/1963 | Miller . |
| 3,129,605 | 4/1964 | Bonnell, Jr. et al. . |
| 3,151,499 | 10/1964 | Roe . |
| 3,217,240 | 11/1965 | Grant et al. . |
| 3,282,125 | 11/1966 | Dully . |
| 3,319,487 | 5/1967 | Lystad et al. . |
| 3,377,881 | 4/1968 | Lucas . |
| 3,400,607 | 9/1968 | Smith . |
| 3,430,512 | 3/1969 | Wössner ........................... 74/512 |
| 3,511,109 | 5/1970 | Tanaka . |
| 3,563,111 | 2/1971 | Zeigler . |
| 3,576,302 | 4/1971 | Palfreyman . |
| 3,631,739 | 1/1972 | McArthur . |
| 3,643,524 | 2/1972 | Herring . |
| 3,691,868 | 9/1972 | Smith . |
| 3,754,480 | 8/1973 | Bodnar et al. . |
| 3,765,264 | 10/1973 | Bruhn, Jr. . |
| 3,785,596 | 1/1974 | Chinchester-Miles . |
| 3,931,943 | 1/1976 | Westergren et al. ............. 244/235 |
| 4,004,537 | 1/1977 | Nilsson . |
| 4,426,890 | 1/1984 | Hansen . |
| 4,470,570 | 9/1984 | Sakurai et al. . |
| 4,695,819 | 9/1987 | Bowsher ........................ 74/512 X |
| 4,848,708 | 7/1989 | Farrell et al. .................... 244/235 |

FOREIGN PATENT DOCUMENTS 1232829  1/1967  Fed. Rep. of Germany ...... 244/235
244760   5/1947  Switzerland .

Primary Examiner—Margaret A. Focarino
Assistant Examiner—James M. Kannofsky
Attorney, Agent, or Firm—Hughes & Multer

[57] ABSTRACT

A modular, pedal-type rudder, brake, and nose gear steering control assembly for an aircraft. The modules are installed below the instrument panel in the cockpit of the aircraft, thus avoiding the need for floor or bulkhead penetrations. Mechanical linkage arrangements are provided for dual side-by-side pilot stations. Adjustable positioning of control pedals relative to each pilot is provided. Pedal adjustment is accomplished by moving the pedals toward or away from a pilot along an arcuate path to an extent dependent upon the length of the pilot's legs. The arcuate path of adjustment is inclined upwardly with respect to the horizontal, providing ergometrically improved operation of the control pedals.

27 Claims, 9 Drawing Sheets

MODULAR RUDDER PEDAL AND BRAKE CONTROL ASSEMBLY FOR AIRCRAFT

RELATED APPLICATION

This application is a continuation-in-part of application Ser. No. 120,324, filed Nov. 13, 1987, now U.S. Pat. No. 4,848,708.

TECHNICAL FIELD OF THE INVENTION

The present invention relates to a pilot station for an aircraft, and more particularly, to a pilot station with novel, improved rudder and brake pedal control assemblies that can be modularly assembled and easily installed and serviced and which are ergometrically improved over prior pedal control assemblies.

BACKGROUND OF THE INVENTION

Current commercial transport airplanes, and indeed most aircraft built today, have onboard a large amount of electronic and computer equipment. For commercial transports, the space required for electronic and computer equipment tends to be substantial, and the total volume required is roughly the same regardless of aircraft size. As a result, and particularly in smaller aircraft, space is at a premium. More importantly, space at the forward end of the fuselage in the vicinity of the pilot station is quite valuable.

One section of premium space in the forward fuselage section which has been heretofore been largely unavailable for stowage of electronic equipment is the space under the cockpit floor. This space is normally occupied by the nose landing gear and by the aircraft directional controls. In most "tricycle gear" aircraft, there is no easy way to completely displace the nose gear from this premium forward space. However, it would be most desirable to reduce space requirements for directional controls and for the accompanying operating mechanisms, mechanical linkages, and cables for those controls and the aircraft's brakes.

Aircraft control is normally described in terms of a three axis system, using the terms pitch, roll, and yaw. Neutral pitch position is when the aircraft's longitudinal axis is in a horizontal position along the direction of flight, a change of pitch involves moving the aircraft nose up or down. Neutral roll position is when wings are in a level position, rolling the aircraft involves moving one wing higher and one wing lower relative to a horizontal axis. Neutral yaw position is a straight ahead orientation, changing yaw involves turning the nose left or right so that the aircraft's longitudinal axis forms an angle with respect to the line of flight. Yaw stability in aircraft is normally achieved by employing the combination of a fixed vertical stabilizer and a movable vertical control surface usually referred to as the "rudder." Rudder control input is normally achieved by pilot operated foot pedals which are also employed to operate the brakes of the aircraft and steer it on the ground. When an aircraft is taxing on the ground, the rudder pedals are operably connected to a steerable nose wheel or wheels, and pushing one or the other of the pedals forwardly causes the nose wheel(s) to turn to the left or the right. In addition, the pedals are mounted for rotation about movable transverse axes at the lower portions of the pedals. By rotating the toe portions of the pedals forwardly and downwardly about these lower axes of rotation, the brakes can be applied.

There are a wide variety of rudder and brake pedal mechanisms. Typically, though, the known systems require cables, pivot arms, levers, and bellcranks to be located beneath the floor of each pilot station; and an aircraft, regardless of its size, will most often have two of these stations. Therefore, the space occupied by the rudder and brake operating mechanisms in the forward part of an aircraft is considerable.

The usual arrangement is to have left and right pedals, each mounted on a pivot arm so that the pedals move in arcuate paths. The two pedals are generally so interconnected that, when one pedal is displaced forwardly, the other pedal moves rearwardly toward the pilot. The pedals are commonly connected to cable systems which: (a) extend from the forward cockpit area to the tail section and are connected to the control device actuators which move the rudder, and (b) similarly connect the pedals to the brake actuators.

One of the shortcomings of most prior art foot pedal assemblies is that, for the pedals to have the linear travel needed for the pilot to provide adequate control, the pedal pivot arms and their associated components have been positioned below the floor level of the cockpit. Not only does this occupy space in the aircraft which could be used advantageously for other functions, but it limits the extent to which the pilot's seat can be moved forward. Forward positioning is desirable since it normally provides the pilot with greater visibility.

Basic control systems for commercial aircraft have also employed hydraulic systems (particularly for brakes). Hydraulic systems have the same above-discussed disadvantages as cable systems in that the pilot-actuated controls are similar; and the lines of hydraulic systems follow generally the same routes and take up at least as much space as the cables of a cable-type system.

Also, computerized electronic control systems, also known as "fly-by-wire" systems, have been available for some time. These systems have typically been employed only in military type aircraft and, until recently, have not been adapted to large, commercial, subsonic transport aircraft. However, improved component reliability in fly-by-wire systems is leading aircraft manufacturers toward the possibility of more widespread use of such electronic, computerized flight control arrangements.

In most proposed fly-by-wire control arrangements, the typical, pilot-operated rudder and brake pedal controls remain unchanged vis-s-vis conventional cable or hydraulic control systems. However, instead of the pedal acting on a cable or a hydraulic actuator, in an aircraft utilizing a fly-by-wire control system, the movement of a rudder pedal actuates a transducer, sending an electronic signal to one or more main flight control computers. The flight control computer in turn sends an electronic signal through an electrical lead to an actuator (typically hydraulic) in the vicinity of the control surfaces, brakes, steerable nose wheel, etc. The actuator moves the aircraft control surfaces to an extent commensurate with the pilot's manipulation of the control input devices or similarly applies the brakes or turns the steerable nose wheel of the aircraft.

Fly-by-wire type aircraft control systems have fewer interrelated mechanical linkages, and less space is needed for equipment. However, full advantage has not been taken of the possibilities offered by these systems.

In particular, one problem which has been until recently been ignored because of the limitations imposed by hydraulic and cable type systems and because the human engineering data we have today was not available when those systems were developed is that of providing ergometrically correct adjustment for the neutral position of control pedals to accommodate pilots of differing physical dimensions. For many years, the only adjustments provided allowed one to raise or lower the pilot seat and move it forward or backward to position a pilot at a comfortable location. Even in most of those few devices that did allow the neutral position of pedals to be adjusted, the adjustment has been along an operating path which was not optimum when considering human limb length and human limb rotation. Also, conventional systems for adjusting pilot seating and control mechanisms do not take into account both pilot comfort and the airline's requirement that each pilot position his or her eyes at a common "eye reference point" for a particular aircraft, regardless of pilot size.

A number of previously issued patents disclose foot-operated pedals for aircraft rudder, brake, or landing gear steering controls, and such devices are commonly used in present day aircraft. Specific patents which appear to deal with the problem of adjusting foot-operated, aircraft control pedals are discussed below.

U.S. Pat. No. 2,585,688 issued to Saulnier on Feb. 12, 1952, discloses a rudder pedal control system ultimately supported by a stationary base. Saulnier does not completely avoid the need for floor penetrations.

U.S. Pat. No. 2,478,546 issued to Pickens on Aug. 9, 1949, discloses an adjusting mechanism for rudder pedals. Although the rudder pedal itself is supported from above, the adjusting mechanism is independently supported by a forward bulkhead which leads to complexity and non-optimum use of available space. Further, the adjusting mechanism is a rather complicated and therefore undesirable set of bevel gears which effect pivotable movement of lever members.

U.S. Pat. No. 2,424,524 issued to Watter on July 22, 1947, discloses an adjustable aircraft rudder pedal mechanism. His mechanism has a floor mounted pedestal which swings fore and aft to position the pedals closer to or further away from the pilot as desired. However, the arc of adjustment results in a lowering of the rudder pedal when the mechanism is brought forward from its neutral position. Thus the arc of travel is such that the system does not accommodate the shorter pilot. Also, Watter's device requires floor penetrations in the cockpit.

U.S. Pat. No. 2,610,006 issued to Boyce on Sept. 9, 1952, shows an adjustable rudder pedal control device which can be supported by laterally related slide tracks. This does not provide ergometrically correct adjustments. Further, the linkage connecting the pedals to the rudder mechanism necessitates floor penetrations to reach conventional rudder cables.

Another adjustable rudder pedal mechanism is taught in my U.S. Pat. No. 4,470,570 issued Sept. 11, 1984. That patent discloses an adjustable rudder pedal control mechanism having laterally spaced slide tracks for positioning pedals. The pedals themselves are adjustable in a linear fashion. While that mechanism is an improvement upon earlier devices, it still does not provide an arc of travel matched with the motion of human limbs.

Also, my copending application Ser. No. 120,324 discloses a novel, improved adjustable rudder pedal control assembly. While the mechanism is free of many above-discussed disadvantages of the prior art devices, it is somewhat complex. Also, it requires a floor covering above the major operating mechanism.

In short, in an advanced transport aircraft, it is undesirable to locate rudder pedal control linkages and support mechanisms in the space below the floor in the forward part of the cockpit. Also, the part-by-part fabrication "in place" of the rudder and brake pedal control mechanisms of commonly employed brake and rudder control mechanisms is undesirable. Also, in an age of high aircraft utilization rates, the "in place" servicing of such mechanisms on the part-by-part basis they require is a decided disadvantage. Thus, there is today a need for a modular rudder and brake pedal control device which can be easily and quickly installed below a conventional aircraft instrument panel without penetrating forward bulkheads or pilot station floors and without occupying the limited space available below the forward part of the cockpit. Additionally, it would be desirable to, at the same time, provide a rudder and brake pedal control neutral position adjustment and a pedal normal travel arc which matches the limb length and joint motions of humans pilots.

BRIEF SUMMARY OF THE INVENTION

I have now invented and am disclosing herein a novel, modular, aircraft rudder and brake pedal control system which solves the problems identified above, which is adapted for simple installation below a standard aircraft instrument control panel, which eliminates the need for penetrations of forward bulkheads or of floor panels, and which provides a simple, economically attractive, ergometrically correct, rudder pedal neutral position adjustment for safe and comfortable use of the system by pilots of varying physical dimensions. Also, my novel system allows pilots of different physical dimensions to safely and comfortably so manipulate the rudder pedals as to apply the brakes of the aircraft.

The modular rudder and brake pedal control assembly or system disclosed herein is installable or positionable generally forwardly of a conventional pilot's seat and is suspended from the bottom of a conventional aircraft control panel. The assembly includes, for each pilot, a pair of foot-operated pedals and linkages for connecting the pedals to the fly-by-wire, hydraulic, or cable-type operating systems for the aircraft brakes, rudder, and nose landing gear steering. Pilot operated pedal movement is in accordance with conventional practice in the art, i.e., forward rotation of pedal top is used for brake operation, and linear displacement of the pedal, i.e., pedal "throw," actuates rudder and nose landing gear steering control.

The rudder pedals are pivotally supported from a fixed frame support so that each pedal assembly, including both pedals and the pedal linkage structure, is pivotable about a substantially horizontal transverse axis. The normal neutral or centered position of the pedals and linkage structure can be adjusted fore and aft so that pedals are comfortably operable by pilots of various physical dimensions.

More specifically, my invention provides a rudder pedal control signal generation station generally comprising a first pilot station (i.e., "pilot's station") including: a first, left rudder pedal; a first right rudder pedal; a first, right brake actuating mechanism; and a first, left brake actuating mechanism. A second pilot station (i.e., "co-pilot's station") is also provided. That station includes: a second, left rudder pedal; a second, right rudder pedal; a second, left brake actuating mechanism; and a second, right brake actuating mechanism. One structural frame supports the first, right and left rudder pedals; and a second structural frame is provided for mounting the second right and left rudder pedals. The first structural frame also supports a first right and left brake actuating mechanism, and the second frame supports a second right and left brake actuating mechanism.

Operatively connected between each structural frame and components linking that frame to the associated rudder pedals is a linear velocity displacement transducer ("LVDT") for converting the displacement of the rudder pedals into electrical signals which are directly or indirectly transmitted to controllers for the rudder or vertical control surfaces. Also, the structural frames and the brake actuating mechanisms are so situated as to provide pivotable movement of the pedals relative to a movable transverse horizontal axis; and the system is provided with linkages which translate that pivotable motion into linear motion for operation of the brake actuating mechanisms.

The pedal neutral position for pilots of different physical dimensions is changed with a summing bellcrank having a cable connected to a pilot operated handcrank. An independently operating summing bellcrank, cable, and handcrank are provided for the copilot. By operation of their respective cranks, the pilot and copilot can independently adjust the neutral position of the left and right rudder pedals at each of the respective pilot stations, providing a different, optimum, neutral rudder pedal position dependent upon their different physical dimensions.

Additionally, the brake mechanisms of the first and second pilot control stations are joined by torque transmission tubes so that brake actuation at either station is transmitted to the corresponding brake pedal at the other pilot station. Similarly, a tie rod is provided between a forwardly located pivot point on each summing bellcrank mechanism so that displacement of the rudder pedals at either pilot station will be transmitted to and will correspondingly displace the pedals at the other pilot station.

Also provided are yaw control feel and centering units. These increase the force required to displace the pedals as the displacement becomes larger. The feel and centering units also urge the rudder pedals of each pilot station toward a neutral position when a force tending to displace the pedals from the neutral position is removed from the pedal control stations.

Thus, in the system disclosed and claimed herein, rudder and brake control signals for use in a fly-by-wire system are generated in a modular rudder pedal control system of simple configuration. The system is easily assembled at the time of aircraft manufacture and is easily serviced in the field. Further, pilots of varying physical dimensions are easily accommodated by independently adjustable neutral pedal positions. Additionally, the pivotal movement provided by the configuration of the present invention is more compatible with human limb length and joint motion than has been the case with most prior devices.

OBJECTS, FEATURES, AND ADVANTAGES OF THE INVENTION

It is one important and primary object of my invention to provide novel, improved, pilot-operated apparatus for controlling such aircraft systems as those employed to operate the rudder, brakes, and steerable nose wheel(s) of an aircraft.

It is another object of my present invention to provide a modular, pedal type rudder control apparatus which can be easily and quickly installed during aircraft manufacture.

It is also an object of the present invention to provide a rudder pedal control apparatus which can be easily and quickly removed for maintenance purposes.

Yet another object of my present invention is to provide a ruder pedal control device which allows independent adjustment of the rudder neutral position at both pilot and copilot stations.

Still another object of the invention is to provide a rudder pedal linkage mechanism having an arc of travel which improves the match between the movement of the pedals and the limb and joint motion of humans.

It is, further, an object of the present invention to provide a rudder pedal control station that simplifies rudder pedal controls in a fly-by-wire aircraft control system.

It is another feature of my present invention that the rudder pedal control apparatus is easily-supported from and below a conventional aircraft instrument panel.

Another feature of my present invention is that both the pilot and a copilot can independently change their respective neutral rudder pedal positions to accommodate their different physical dimensions and individual needs.

Yet another, although related, feature of the present invention is that the movement of rudder pedals when viewed from above is in a concave arcuate path which matches human limb motion, particularly at the forward and rearward positions they occupy during full rudder displacement.

An advantage of my present invention, therefore, is that it provides pedal adjustment and operational motions that are biomechanically superior to previously known rudder and brake pedal assemblies.

A related advantage is that the invention provides additional space for pilot leg room.

Another advantage of the present invention is that penetrations through the forward bulkhead or through the pilot control station floor are not required.

Yet another advantage of the invention is that it provides substantial weight and cost savings because it is simple in design, reduced in size, and requires only simple structural attachments for mounting the entire assembly in the cockpit. Not only does this result in cost savings with respect to manufacturing the assembly, but also cost savings in installation. As suggested above, control assemblies with pilot-operated pedals for controlling brakes, rudder, and steering have been built into the cockpit piece-by-piece. In comparison, each pilot station control unit of the present invention can be built outside the aircraft and then installed in the cockpit as a unit.

It is still another advantage of the present invention that the apparatus can be easily removed from either a pilot station or from a copilot station for service or replacement independently, quickly, and easily.

It is yet a further advantage of the present invention that easily reached locations are provided for the linear velocity displacement transducers utilized in fly-by-wire aircraft control systems. This is of particular advantage in advanced commercial transport aircraft.

Additional objects, advantages, and novel features of the invention will be set forth in part in the description which follows and in part will become apparent to those skilled in the art upon examination of the foregoing in conjunction with the drawings, or may be learned by practice of the invention. The objects and advantages of the invention may be realized and attained by means of the instrumentalities and combinations particularly pointed out in the appended claims.

BRIEF DESCRIPTION OF THE DRAWINGS

The invention may be more clearly understood by reference to the accompanying drawings thereof wherein.

In the drawings, the same reference characters are used to identify like parts throughout the various views.

DETAILED DESCRIPTION OF THE INVENTION

The present invention involves a novel and improved, modular, rudder pedal control assembly which is particularly advantageous for use in modern digital electronic—or "fly-by-wire"—aircraft control systems.

In a fly-by-wire aircraft control system, the signal that controls the hydraulic actuators for the rudder and brakes and a steerable nose wheel are generated electronically at the pilot control station and transmitted via a computerized flight control system, which outputs a modified, but corresponding signal, to an electronic actuator for a hydraulically powered control surface, brake, or nose wheel positioner. In order to fully understand the present invention, the differences between a cable control system for aircraft and a fly-by-wire control system is necessary; and a comparison of those systems is consequently provided below.

Figure 1:
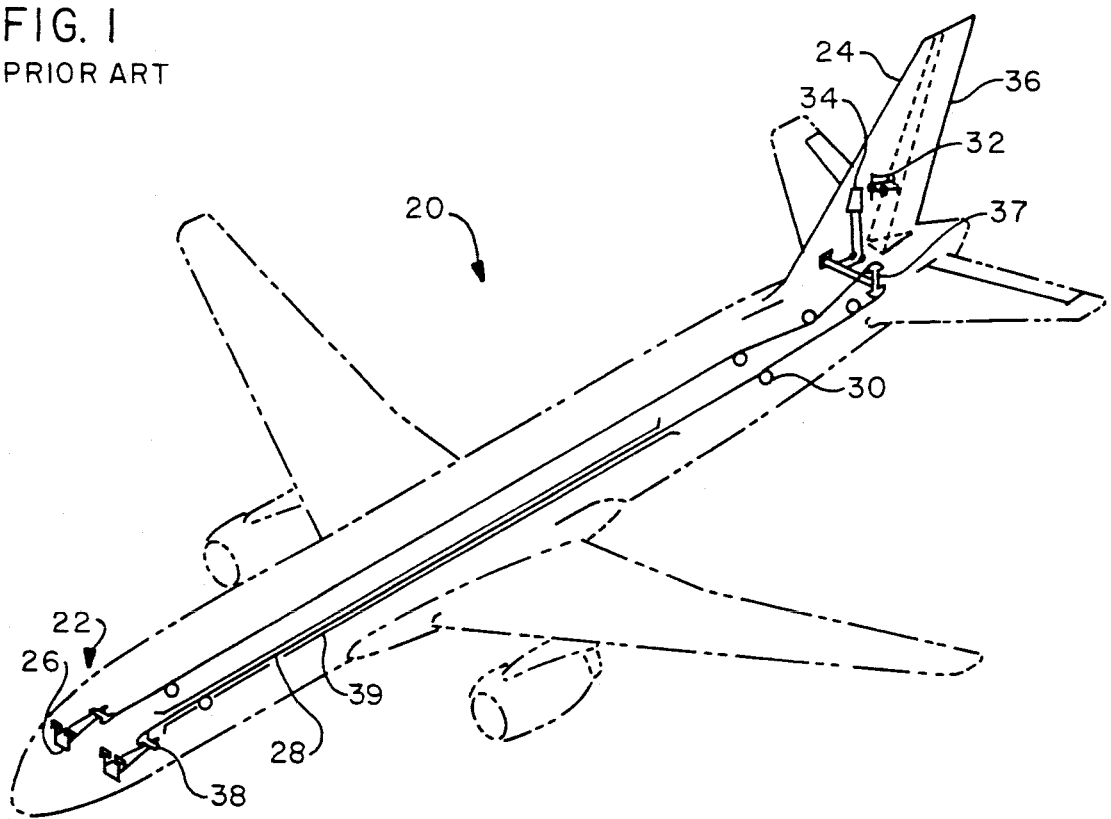
FIG. 1 is a perspective view of an airplane with a typical, prior art, pedal-actuated, cable control system connected to the vertical control surface or rudder at the tail of the aircraft.

FIG. 1 illustrates an aircraft 20 having a typical prior art aircraft cable control system for vertical control surface actuation. Airplane 20 has a forward cockpit area 22 (i.e., control signal generation station location) and a vertical stabilizer 24. As used generally herein, forward means toward the nose (i.e., in the direction of aircraft travel); and rearward means toward the tail of an aircraft.

Located in the cockpit area 22 is a pair of rudder pedal control assemblies 26. The rudder pedal control assemblies 26 are operatively connected to a set of control cables 28 which traverse the length of the aircraft over pullies 30, ultimately reaching a vertical stabilizer control component assembly 32 located within vertical stabilizer assembly 24. Through a suitable linkage 37 in the vertical stabilizer control assembly 32, a power control actuator 34 operated by cables 28 controls and powers the movement of a rudder 36 which is pivotably attached to the aft end of vertical stabilizer 24. In this conventional control system for airplane 20, the rudder pedal control assembly 26 must be configured so that motion can be transmitted from it via cables 28 to the mechanical linkage 37 operatively connected to power control actuator 34, and thereby provide the force necessary to move the vertical control surface or rudder 36. To achieve this result, premium space in the forward cockpit area 22 must be allocated to mechanisms 38 for linking the pedals to the control cables and to cable conduits 39. Further, it can be appreciated that rudder pedal linkage mechanism 38 and cable components 28 may be located in areas of aircraft 20 which are difficult to inspect or to service.

Figure 2:
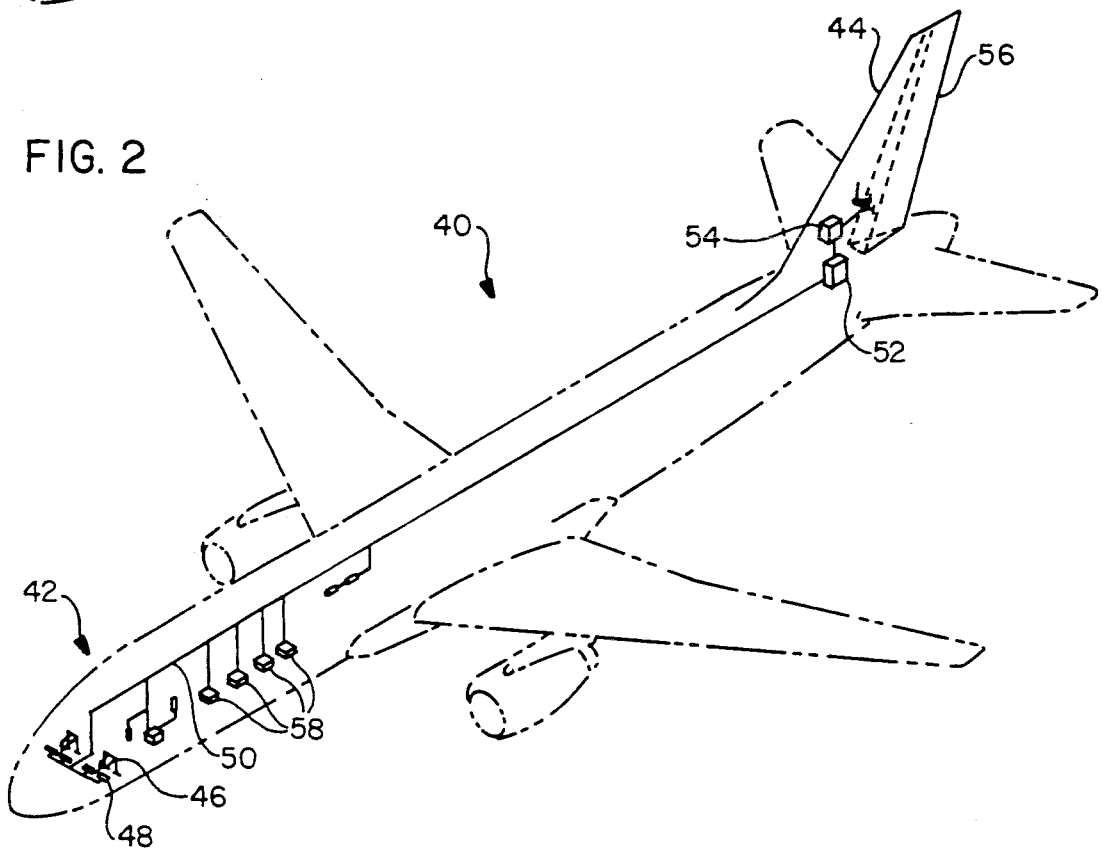
FIG. 2 is a perspective view, similar to FIG. 1, illustrating schematically a fly-by-wire electronic control system wherein pilot-operated controls in the cockpit area generate electrical signals for actuation devices located at the controlled systems at the rear of, or elsewhere in, the aircraft, generally by way of an aircraft flight control computer.

As can be seen in FIG. 2, a fly-by-wire control system eliminates cables 28. That figure shows an airplane 40 having a forward cockpit area 42 and a vertical stabilizer 44 and designed in accord with the principles of the present invention. A pair of rudder pedal control assemblies 46 are provided in the forward cockpit area 42. The pedal control assemblies 46 are suspended from and below instrument panel 7 and operatively connected to LVDT's 48. Those transducers translate the motion or displacement of rudder pedals into electrical signals. Electrical signals thus generated are transmitted by an electric wire or wires 50 to a flight control computer 58 which outputs a corresponding electrical signal to a remotely located control device 52 for a control actuator 54. The control actuator 54 displaces to the left or the right and centers in a neutral position the vertical control surface, i.e., rudder 56, which is pivotably attached to the aft end of vertical stabilizer 44.

In most cases in current transport aircraft, a flight control computing system 57 with redundant flight control computers 58 is normally supplied. Even from the much simplified perspective of the aircraft 40 presented in FIG. 2, one can appreciate that a considerable part of the space beneath the cockpit is occupied by mechanical components, even when a conventional computerized flight control system 57 is employed. I pointed out above that this space is at a premium and that anything which can be done to save the space will be advantageous. In particular, the saving of space below the floor of forward cockpit area 22 is most desirable.

Figure 3:
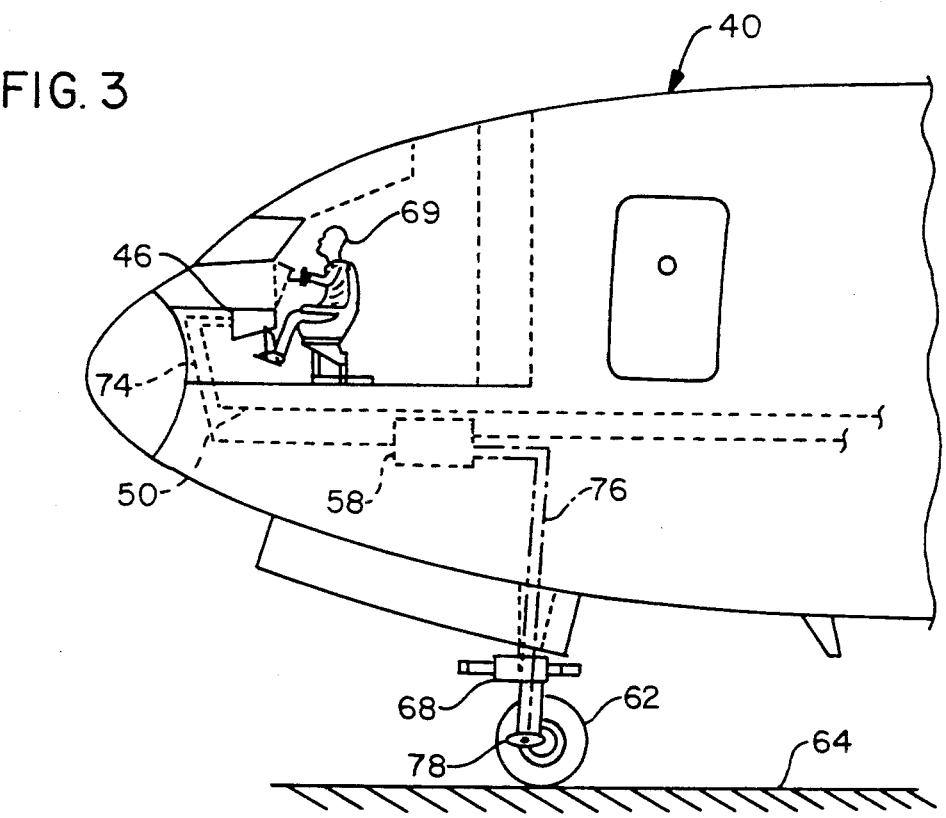
FIG. 3 is a partial side view of the forward fuselage or nose area of an aircraft body showing the location of a pilot station and the aircraft nose gear.

Referring still to the drawing, FIG. 3 shows a modular rudder pedal control assembly 46 designed in accord with the principles of the present invention to conserve the below-the-cockpit space required by a fly-by-wire control system and to provide the other advantages discussed above. Modular rudder pedal control assembly 46, in addition to providing signals for controlling the displacement of vertical control surface 56, is also normally utilized to generate steering and braking system control signals. The rudder pedal control assembly 46 has operatively attached thereto a LVDT 48 which provides to computer 58 via wires 50, an electrical signal describing the desired direction of travel of aircraft 40. The aircraft 40 has a steerable nose gear assembly 62 which, as shown in FIG. 3, rests on surface 64. Upon receipt of a pilot-originated directional signal from assembly 46, computer 58 processes and forwards the signal to a directional power control actuator 68 which turns nose gear 62 to the desired heading.

In a fly-by-wire system, braking is similarly accomplished. The pilot 69 depresses rudder pedals (later illustrated) incorporated in rudder pedal control assembly 46 to actuate a brake controlling mechanism also incorporated in that assembly. The brake actuating mechanism is operatively connected to a brake transducer 72 (later illustrated and described) which generates an electrical signal with a magnitude related to the displacement of the brake actuating mechanism 70 and, therefore, to the magnitude of the braking effort wanted by the pilot. The electrical signal is transmitted by an electric wire or wires 74 to flight control computer 58. In turn, control signals are outputted from the computer through wires 76, 76', etc., to hydraulic brake actuators 78 in nose gear 62 and in the main landing gear or at other appropriate hydraulic system interface points.

Figure 4:
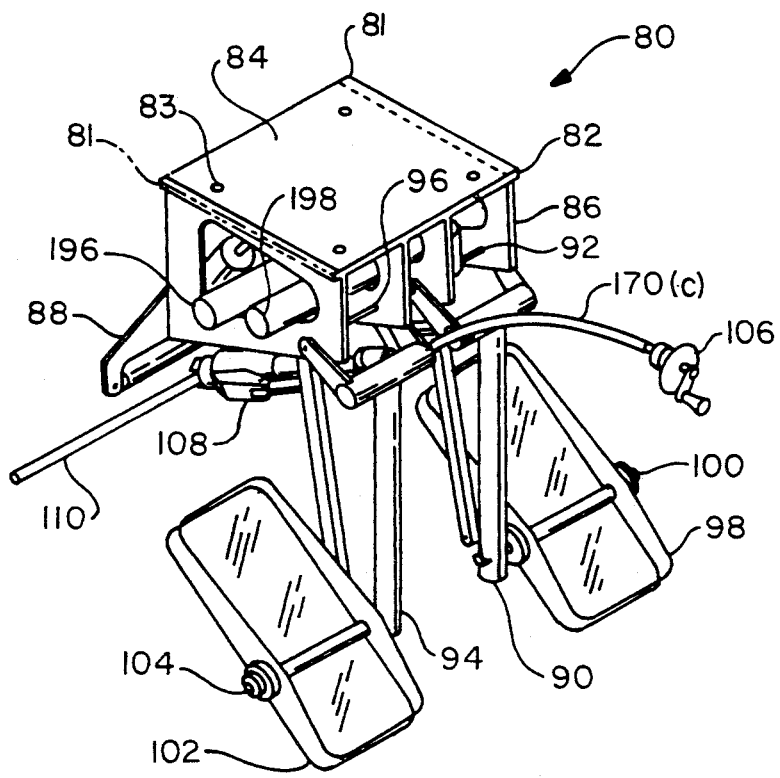
FIG. 4 is an isometric view of one pilot station rudder pedal control apparatus employing the principles of the present invention.

Attention is now directed to FIG. 4 which depicts a pilot rudder and brake pedal control station assembly 80, in this case one configured for installation in the cockpit 42 of aircraft 40 at the right hand or copilot position. The rudder and brake pedal control station assembly 80 is housed in a structural frame or base 82. This frame is fixed to and supported from instrument panel 47. Attachment of frame 82 to instrument panel 47 may be accomplished by inserting structural frame lip 81 into a longitudinally extending slide channel (not illustrated) in the instrument panel as taught in my U.S. Pat. No. 4,470,570 (hereby incorporated herein by reference) or with releasable or removable fasteners (not illustrated) extending through apertures 83, or by various other means known in the art. However, the use of slide channels or similar devices may simplify assembly and maintenance requirements and therefore be preferred.

Structural frame 82 is comprised of a horizontally disposed platform 84; two pairs of spaced apart, longitudinally running and vertically disposed support brackets 86; and a transversely oriented, vertically disposed transducer support bracket 88 which is fixedly attached to the lower forward edges of the vertical support brackets 86. A right pedal pivot beam 90 is pivotably suspended from the right hand pair of vertical support brackets 86 via a horizontally mounted, transverse, right pivot pin 92. A similar, left pedal pivot beam 94 is pivotably suspended from the left-hand pair of vertical support brackets 86 via horizontally mounted, transverse, left pivot pin 96. A right rudder pedal 98 is pivotably attached to right pedal pivot beam 90 via a horizontal, transversely mounted, pedal pivot pin 100. Similarly, a left rudder pedal 102 is pivotably attached to left pedal pivot beam 94 via a horizontal, transversely mounted, rudder pedal pivot pin 104.

A copilot pedal adjustment crank assembly 106 is operatively connected by cable 107 to a summing bellcrank shaft assembly 108 in order to adjust forwardly or rearwardly the neutral or centered positions of the left pedal pivot beam 94 and the right pedal pivot beam 90. Since pedal pivot beams 90 and 94 are suspended from and below pivot pins 92 and 96, adjustment of the neutral pedal position rearwardly (toward the pilot) results in a rearward and upward adjustment. Similarly, adjustment of the neutral positions of pedal pivot beams 90 and 94 forwardly (toward the aircraft nose) results in a downward adjustment, at least to the vertical pivot beam position. The upward arcuate path of motion during adjustment results in operational positions for pedals 98 and 102 which are ergometrically superior to earlier designs. The upward arcuate path of motion is significantly better than a downward arcuate path, where, for instance, forward pedal adjustment also results in downward adjustment that results in more acute angles for ankle motion, thus inconveniencing shorter pilots. Also, the upward arcuate path of motion is ergometrically superior to the adjustment paths provided for my earlier control system disclosed in U.S. Pat. No. 4,479,570. In that control assembly, pedal movement is along a linear path inclined slightly upwardly and rearwardly.

Also shown in FIG. 4 is a tie rod 110 which is pivotally attached to the bottom forward end of the summing bellcrank/jackshaft assembly 108. Tie rod 110 is used to transmit motion to a corresponding bellcrank located at the lefthand, or pilot's, rudder and brake pedal control station 112.

Figure 5:
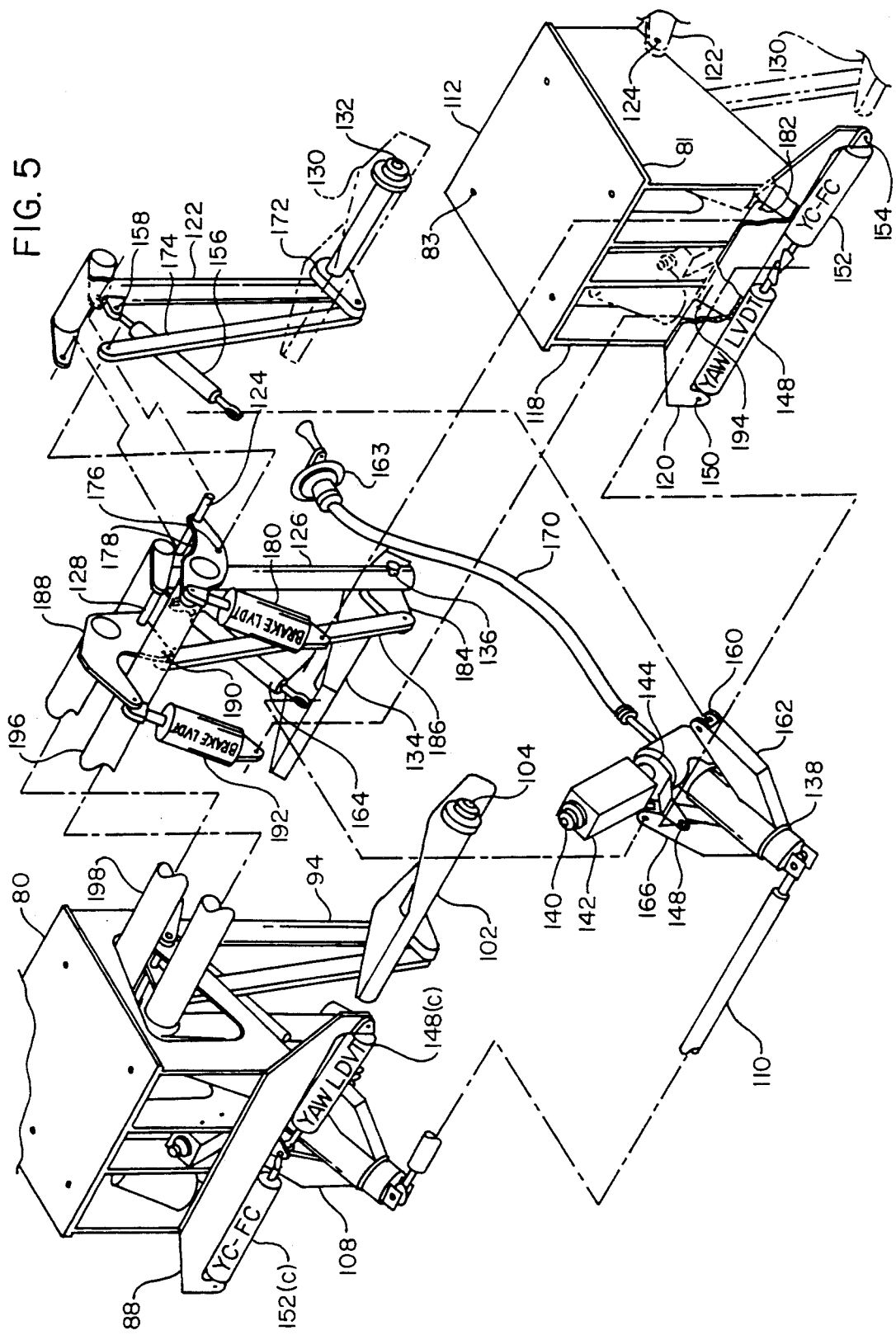
FIG. 5 is a semi-schematic view of the pilot station and a second, copilot station, showing in a partially exploded form various linkages for interconnecting the pilot control stations.

Turning now to FIG. 5, there is illustrated in that figure details of the linkages and operating mechanisms of the present invention. A copilot station 80 is again shown as is the corresponding apparatus for a pilot rudder and brake pedal control station 112. Pilot station apparatus 112 is similar to the copilot station 80. Pilot station 112 has a structural frame or base 114 which consists of a horizontally disposed, upper mounting plate 116; two pairs of spaced apart, vertically disposed, support frame brackets 118 running longitudinally along the underside of plate 116; and a transversely oriented, vertically disposed, transducer support bracket 120 mounted across the forward end of the two pairs of vertical support brackets 118.

The inner components of the pilot station apparatus 112 are shown in FIG. 5. They include a pilot station left pedal pivot beam 122 pivotally attached to the left pair of vertical support brackets 118 via a horizontally mounted, transverse pivot pin 124. Similarly, a pilot station right pedal pivot beam 126 is pivotally connected to the right pair of support brackets 118 by a horizontally mounted, transverse, right pedal pivot pin 128. The pilot's left rudder pedal 130 is pivotally affixed to the left pedal pivot beam 122 via the left rudder pedal pivot pin 132. The pilot's right rudder pedal 134 is pivotally affixed to the pilot's right rudder pedal pivot beam 126 via the right rudder pedal pivot pin 136. For convenience of the reader, the pilot's left pedal pivot beam 122 and pedal 130 are shown in solid lines in the partially exploded portion of the figure and in partial phantom lines at their actual working locations.

Situated at the lower forward portion of the pilot rudder and brake pedal control station assembly 112 is a pilot station summing bellcrank/jackshaft assembly 138. The summing bellcrank/jackshaft assembly 138 is pivotally mounted on a stationary reaction rod 140. The reaction rod 140 is securely mounted between the left and right pairs of vertical support brackets 118 by reaction shaft housing 142. A feel and control crank 144 is securely mounted in a rotatable assemblage with the summing bellcrank/jackshaft assembly 138 so that the assemblage is rotatable about the stationary reaction rod 140.

A yaw control LVDT 146 is operably secured between a pivot point 148 on the feel and control crank 144 and a pivot point 150 on the transducer means support bracket 120. Opposite the yaw control LVDT 146 is a yaw control feel and centering unit 152. This unit is mounted between a pivot point 148 on the feel and control crank 144 and a pivot point 154 on transducer support bracket 120. The yaw control feel and centering unit 152 is of conventional design. Its function is to restore pedal pivot beams 122 and 126 to neutral positions when forces acting on pedals 130 and 134 are released. Further, as the movement of pedal beams 122 and 126 increases, the force exerted by the feel and centering mechanism 152 also increases so as to provide a greater resisting force corresponding to increased linear displacement of pedal beams 122 and 126.

The left pedal pivot beam 122 is operably connected to the summing bellcrank/jackshaft assembly 138 via a linkage 156. A pivot connection 158 is provided on pivot beam 122, and a companion pivot connection 160 is provided by an outwardly projecting arm 162 of summing bellcrank assembly 138. This arrangement provides a secure linkage between the summing bellcrank assembly 138 and left pedal pivot beam 122 while allowing freedom of movement of pedal beam 122, linkage 156, and bellcrank 138. Similar is a linkage 164 which operably connects pedal pivot beam 126 with right arm 166 of summing bellcrank/jackshaft assembly 138.

Also illustrated in FIG. 5 is a pilot's pedal neutral position adjustment crank 168 and a cable 170 which operably connects crank 168 with summing bellcrank/jackshaft assembly 138. Operation of this system is later described.

Brake operation mechanisms may also be seen in FIG. 5. At the pilot's rudder and brake control station 112, left pedal 130 is operably connected to crank 172, which in turn is pivotally connected to brake input tension rod 174. At a pivot point 176, the tension rod 174 is pivotally connected to a left brake crank and torque tube attachment 178. The upper end of the pilot's left brake LVDT 180 is pivotally attached to the forward end of left brake crank and torque tube attachment 178. The lower end of LVDT 180 is pivotally attached to a tab 182 which extends rearwardly from transducer support bracket 120 approximately midway between those members of the left pair of vertical support frame brackets 118. In a similar fashion, right pedal 134 is operably connected to pedal brake crank 184, which is in turn pivotally attached to brake input tension rod 186.

Right brake input tension rod 186 is pivotably attached to right brake crank and torque tube attachment 188 at pivot 190. The upper end of the pilot's right brake LVDT 192 is pivotally attached to the forward end of the right brake crank and torque tube attachment 188. The right brake LVDT 192 is pivotally attached to frame 112 by a tab 194. That tab is centered between the two right-hand vertical support frame brackets 118 and is located forward from and secured to transducer support bracket 120. Brake cranks 178 and 188 are arranged to pivot about axes 124 and 128, respectively.

In "side-by-side," dual control unit applications as illustrated in FIG. 5, it may be advantageous to mechanically link the pilot station 112 with the copilot station 80. This allows control to be smoothly passed from one pilot to the other, for example, as the controls operated by the pilot receiving control will be in the same positions as the controls of the pilot relinquishing control. In furtherance of this objective, tie rod 110 transmits rudder pedal pivot beam displacement from one pilot station to the other. Tie rod 110 is pivotably connected between the lower forward end of the pilot's bellcrank 138 and the copilot's bellcrank 108. To mechanically transmit braking input signals between pilot station 112 and copilot station 80, a left brake torque tube 196 and a right brake torque tube 198 are provided. These torque tubes are respectively connected to and extend between the torque tube attachments 88 of the pilot's control station 80 and the torque tube attachments 88 of the copilot's control station 112. Tie rod 110 and torque tubes 196 and 198 may be provided in suitably linked sections joined by various well-known methods so that they may be connected up after the modular stations 112 and 80 are installed in an aircraft.

It must be appreciated, in conjunction with the foregoing, that the rudder and brake pedal control assembly of the present invention is eminently suitable for aircraft with a single pilot station and for front and rear type, dual pilot stations. In these applications of the invention, it is unnecessary to provide the various, just-described mechanical linkages (particularly tie rod 110 and torque tubes 196 and 198).

As the hardware in the copilot station 80 is essentially identical to that located in the pilot station 112, parts in the copilot station 80 may not specifically be described herein. Furthermore, such components may be identified in the drawings and/or referred to later in this description by utilizing the part number for the pilot station with the suffix (c). Also, since repetitious description of every part duplicated in a second pilot control station is unnecessary to enable those skilled in the art to practice the present invention, details of construction and operation for only one station will be elucidated with the understanding that such details are essentially the same for all modular pilot stations in a given, multistation application of the present invention.

Figure 6:
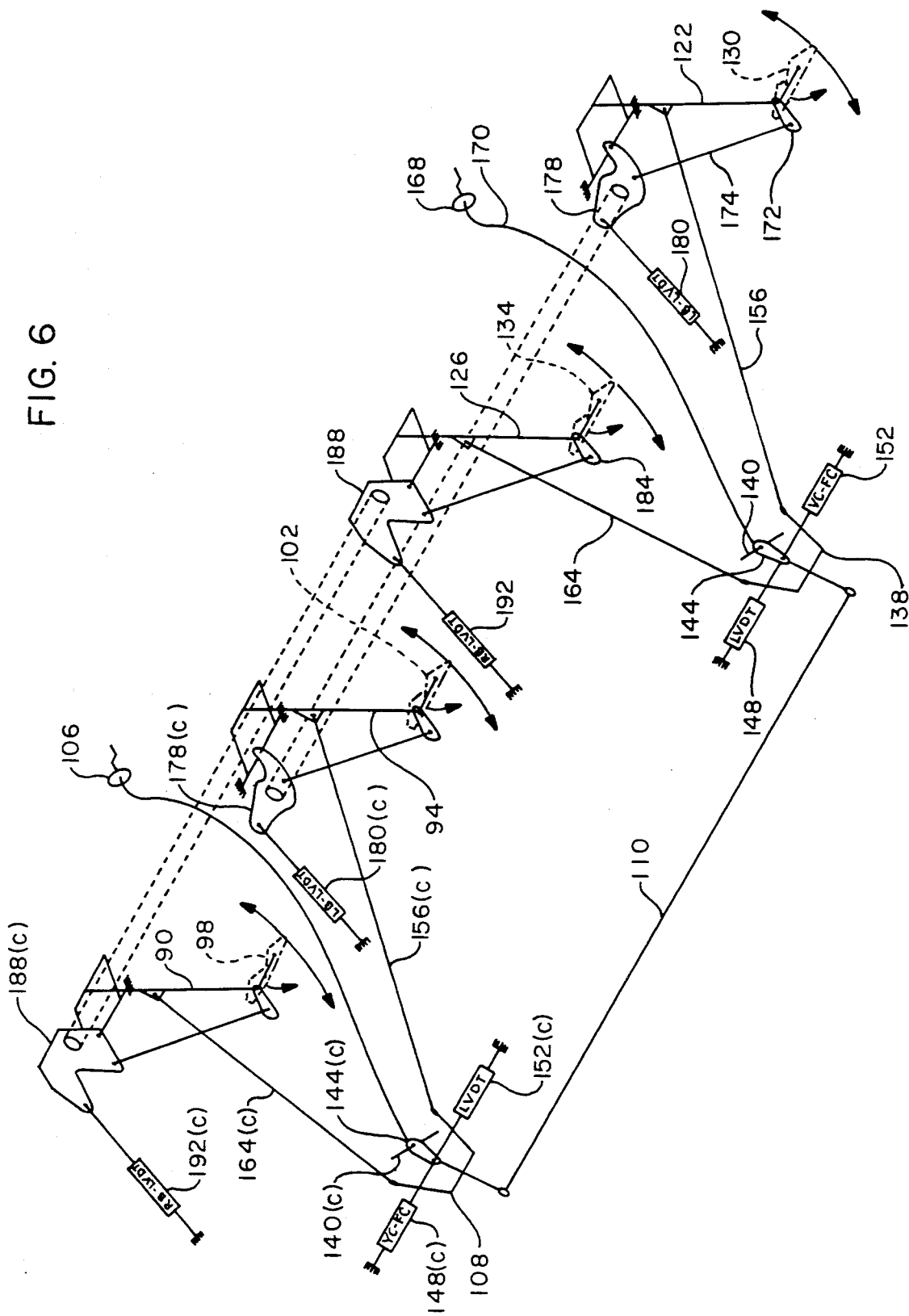
FIG. 6 is a schematic, isometric view of the linkages and operating components of the control signal generation or pilot stations.

Turning then to FIG. 6, the operation of the rudder, brake, and steering systems which are illustrated in FIG. 5 will now be described.

Yaw control input is by forward and rearward movement of the pedal pivot beams at the active pilot station. At pilot station 112, for instance, forward movement of left rudder pedal pivot beam 122 displaces linkage 156 forwardly to move bellcrank 138 in a clockwise direction around reaction rod 140. Feel and control crank 144, being securely mounted in a rotating assemblage with bellcrank 138, rotates with the bellcrank 138 in a clockwise direction, causing a linear displacement in the yaw control LVDT 146. That movement results in LVDT 146 outputting an electric signal with a magnitude corresponding to the linear displacement of the pedal beam 122.

As pedal beam 122 is displaced forwardly, the clockwise translation of bellcrank 138 about reaction rod 140 tensions linkage 164, and pedal pivot beam 126 moves rearwardly. Thus, as either the left or the right pedal pivot beam at a pilot station is displaced from the neutral position, the opposite pedal is displaced a corresponding amount in the opposite direction. Since the pilot station 112 and the copilot station 80 are connected at the forward end of bellcranks 138 and 108 by tension rod 110, displacement of any pedal is immediately reflected by a corresponding displacement of all pedals.

The description of the actuation of the pilot station's left brake pedal pivot beam 122 is equally applicable to the operation of the pedals at other positions.

Brake operation is also readily apparent from FIG. 6. Input resulting in application of the brakes is provided by rotational movement of the upper or toe ends of the pedals about a movable, transverse, horizontal axis located outward from each pedal. To brake left from pilot station 112, the pedal 130 at that station is rotated forward, thereby displacing downwardly the left brake pedal crank 172 rigidly attached to pedal 130. Thus, when the left pedal 130 is rotated forwardly and downwardly about its horizontal axis 132, the brake pedal crank 172 acts through brake tension rod 174 to rotate brake crank torque tube attachment 178 in a downward direction. Brake LVDT 180 is operatively connected to brake crank torque tube attachment 178 in a manner such that it outputs an electrical signal related to the degree of rotation of pedal 130 about its axis 132. The other pedals have similar linkages and transducers.

In the embodiment of my invention illustrated herein, the brake LVDT's 180, 180(c), 192, and 192(c) have integral feel springs and viscous dampers. However, such functions may be separately provided and yet achieve the same operational result. The feel springs and viscous dampers increase the force required for rotation of pedals about their axes as the degree of rotation increases (i.e., increase the force required for pedal rotation as braking increases). This minimizes the possibility of inadvertent overbraking.

Shown in dotted lines in FIG. 6 are the left brake torque tube 196 and right brake torque tube 198. The torque tubes transmit braking motion between pilot stations 80 and 112. Whenever a braking input is provided at one pedal, the corresponding pedal at the other pilot station is mechanically displaced by an equal amount via torque tube 196 or 198.

Figure 7:
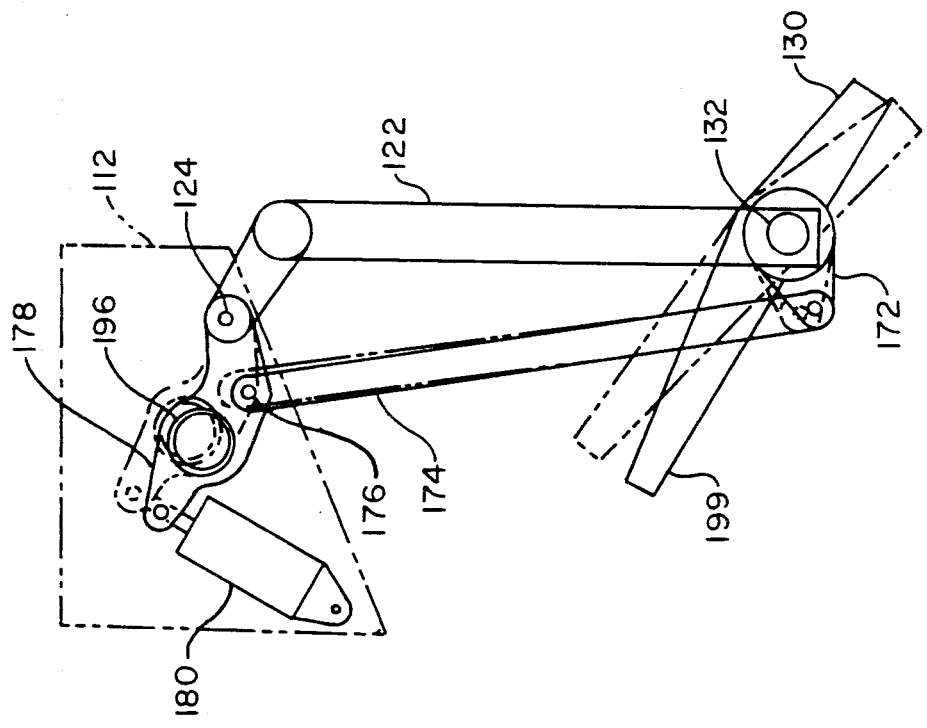
FIG. 7 is a vertical side view which illustrates the operation of the left brake pedal of the pilot station.

Turning now to FIG. 7, the representative displacement of left torque tube 196 which occurs during braking action is illustrated. The normal position for the pedal inputting to tube 196 is shown in hidden lines, and a braking pedal position is shown in solid lines. As the toe portion 199 of pedal 130 is rotated forwardly and downwardly, left pedal brake crank 172 rotates downwardly and tensions brake rod 174, displacing brake crank torque tube attachment 178 forwardly and downwardly about pivot axis 124. The forward end of brake crank torque tube attachment 178 is moved downward, thereby causing a linear displacement in left brake LVDT 180. This generates an electric signal corresponding in magnitude to the linear displacement of pedal 130. Torque tube 196 effectually transmits the linear displacement from the pilot station 112 to the copilot station 80, and vice versa, so that the two pedals have the same displacement.

Figure 8:
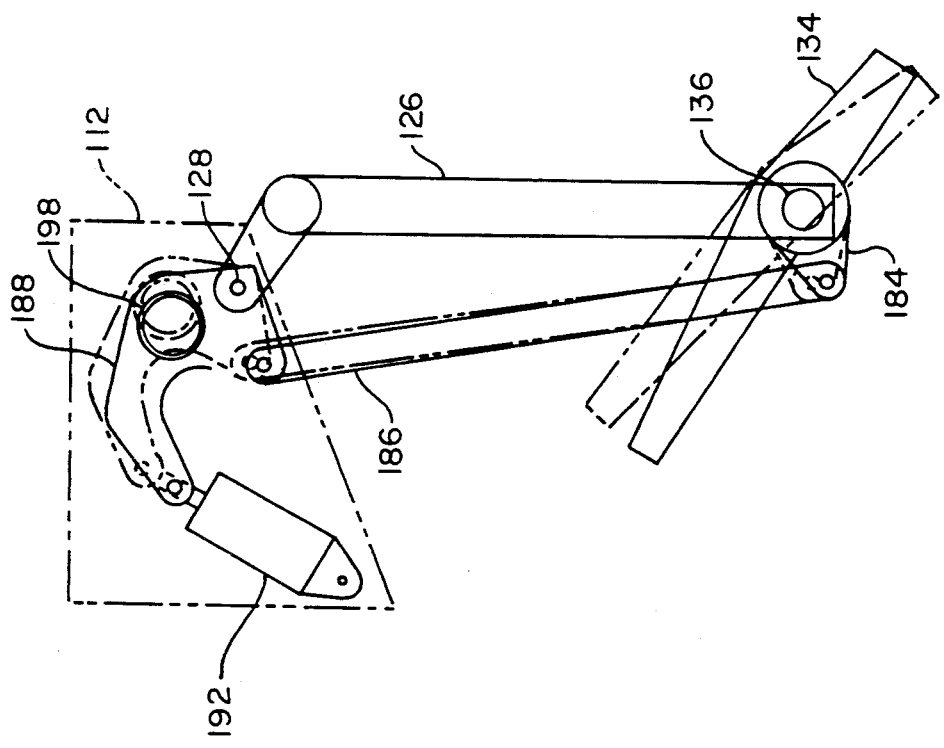
FIG. 8 is a side view illustrating the operating of the right brake actuating mechanism of the pilot station.

FIG. 8 illustrates the operation of the right brake system. That operation duplicates the operation of the left brake system and will accordingly not be described further herein.

Figure 9:
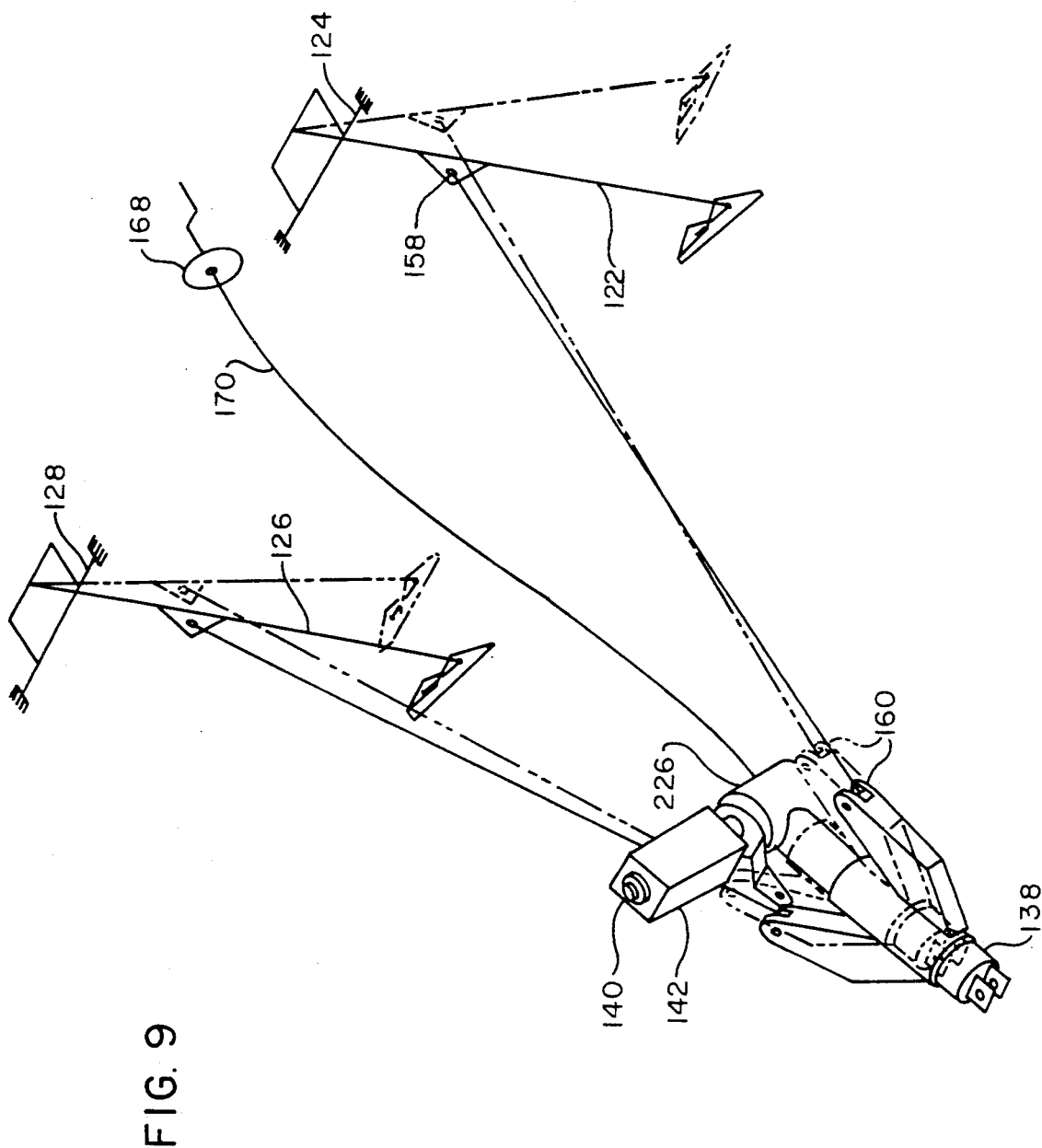
FIG. 9 is a schematic view of the operating components of the pilot station, illustrating the adjustment of a neutral pedal position.
Figure 10:
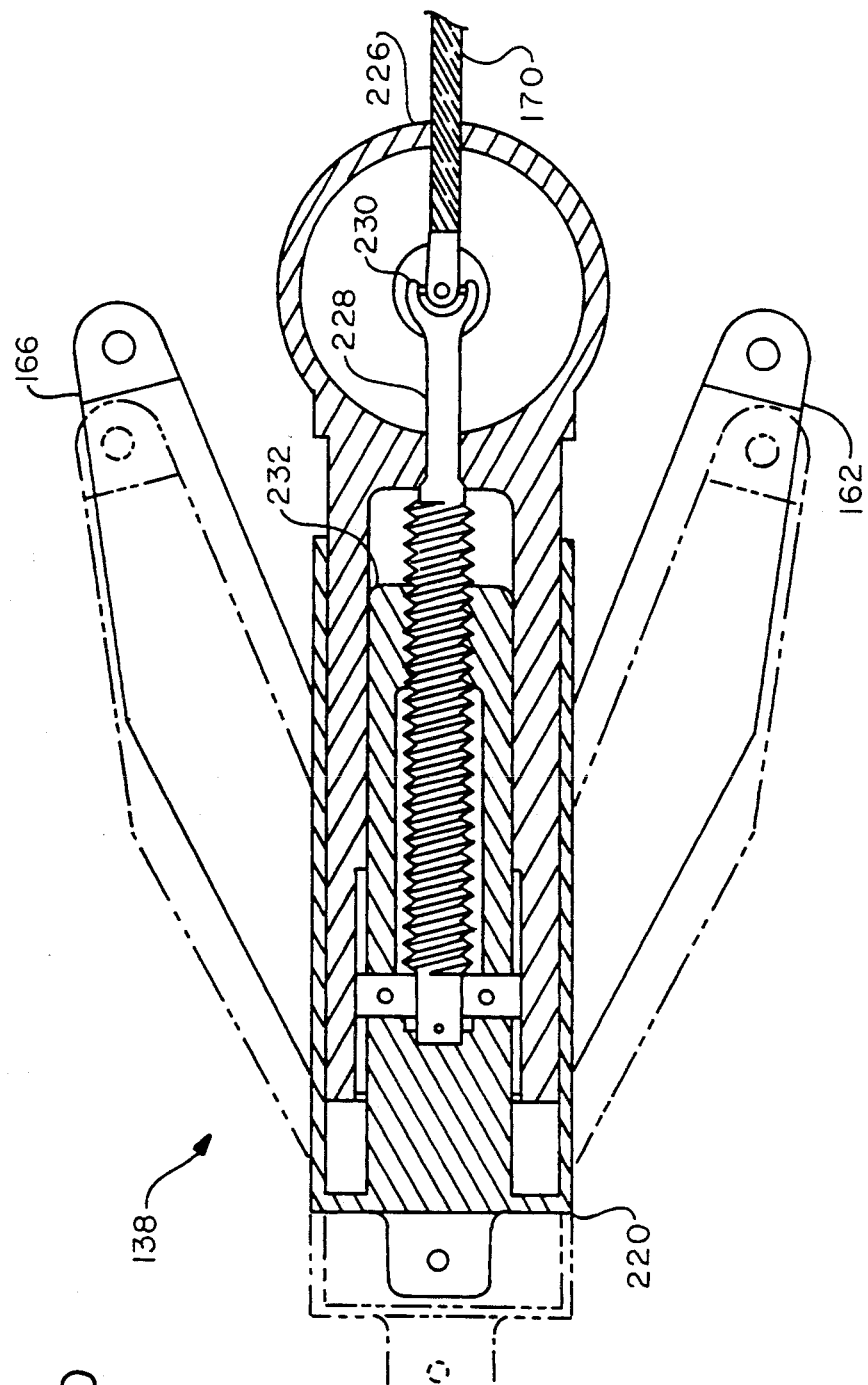
FIG. 10 is a horizontal cross-section of a summing bellcrank mechanism utilized to provide neutral rudder pedal position adjustment in stations employing the principles of the present invention.

Turning now to FIG. 9, I pointed out above that provision is made for independent forward and rearward adjustment of the neutral positions of the pedals at each of the pilot stations 112 and 80. At each of these stations, the adjustments are made with the pilot's (or copilot's) neutral adjustment crank 168. Turning that crank rotates cable 170, thereby rotating and repositioning a jackshaft (later illustrated) in summing bellcrank/jackshaft assembly 138. As a consequence, the pedals 130 and 134, illustrated in solid lines at a forward position, can be moved to a rearward position (shown in hidden lines) closer to a shorter pilot, for instance. The exact degree of adjustment per turn of the handcrank will depend on many factors, including the pitch of jackshaft threads 200 and the location of pivot point 158 relative to pivot axis 124; and a suitable arrangement can be easily achieved by those skilled in the art. The important concepts are that the modular control station assemblies just described can be installed and interconnected without floor penetrations and that these assemblies have an upward arc of adjustment of the neutral pedal position and a forward and upward arcuate motion path for pedal displacement.

The internal operation of summing bellcrank/jackshaft assembly 138 will now be briefly described. The summing bellcrank/jackshaft assembly 138 has a left arm 162 and a right arm 166, both of which are secured to an external, slideable housing 220. The external housing 220 slidingly fits over a tubular shaft member 222 which has a shaft portion 224 and a head portion 226. Head portion 226 is shaped to fit reaction rod 140 so that the entire bellcrank/jackshaft assembly 138 may be rotatingly secured about reaction rod 140. When the pilot rotates neutral pedal position adjustment crank 168, cable 170 rotates, thereby rotating a threaded jackshaft 200 which is operatively connected to cable 170 via a coupling 230 such as a universal joint. A threaded follower 232 is engaged with jackshaft 200 to translate rotational motion of jackshaft 238 into a forward or rearward movement of the external slideable housing 220. A variety of techniques for accomplishing the required bellcrank displacement are known. Therefore, further specifics will not be given herein. Operation of summing bellcrank/jackshaft assembly 108 is similar to the just described operation of assembly 138.

Figure 11:
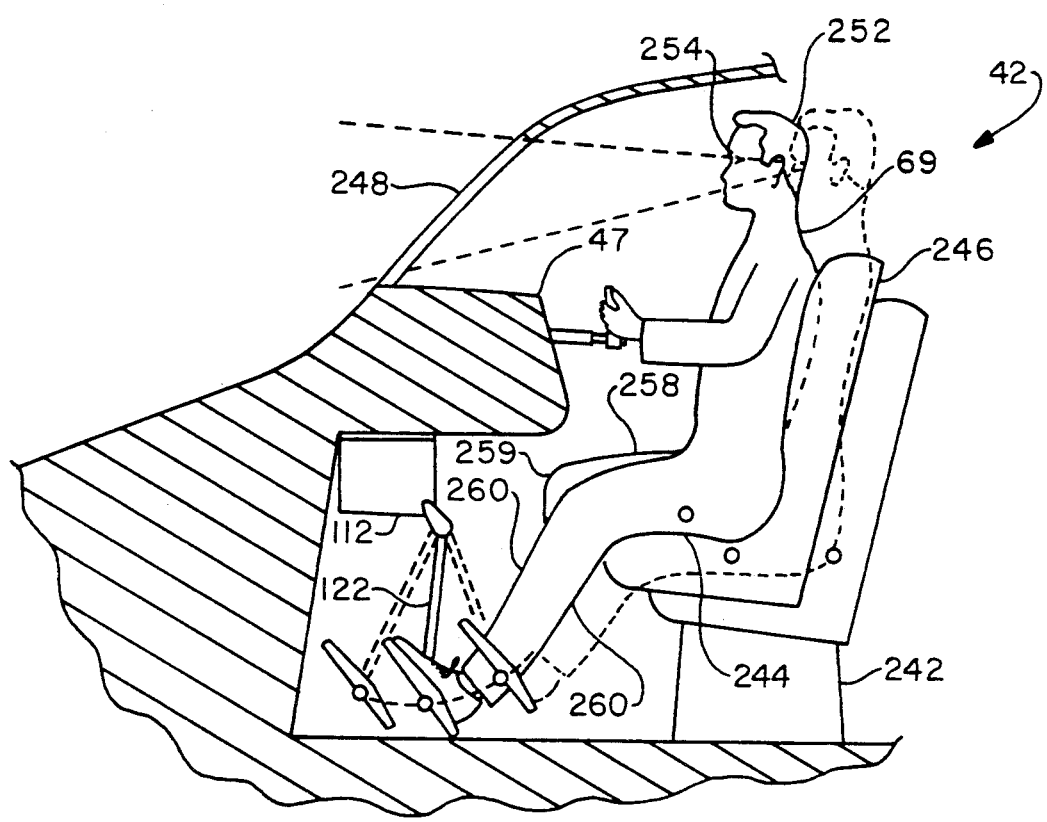
FIG. 11 is a side view of the cockpit of an aircraft illustrating the control signal generation station in which the rudder pedal control assemblies of the present invention are incorporated.

Reference is now made to FIG. 11 which illustrates how the control signal generation station of my invention may be incorporated into an aircraft cockpit. The cockpit area is generally designated 42, and it has a pilot seat 242 with a generally horizontal seat 244 and a backrest 246. The control assembly 112 is located beneath instrument panel 47. The cockpit has a forward window 248, and the pilot 69 is positioned with his head 252 at the optimum eye reference location 254 which gives him maximum visibility through window 248.

A small pilot is shown in full lines at 69, while a taller pilot is shown in broken lines superimposed over the full-line illustration of the shorter pilot. It can be seen that, if seat 242 is moved rearwardly to accommodate the longer legs of the taller pilot (including thigh 258, knee 259, and calf 260), the pilot's head would be moved rearwardly of the optimum eye reference location. However, little or no forward and rearward adjustment of seat 242 is necessary with the present invention. That invention instead accomplishes the desired result, i.e., keeping the pilot's head at the proper eye reference location 254, while making it safe and comfortable for the pilot to operate the brake and rudder pedals by providing biomechanically improved pedal operating position adjustments for the pilot. These can be used with primarily only vertical adjustments of the seat to attain a correct ergometric relationship of the pilot to the pedals and maximum visibility.

To accommodate a taller pilot, seat 242 may be lowered, but it is not necessary to move it rearward to any extent at all. This enables the pilot's head 252 to remain at the optimum eye reference location 254 since the taller pilot will normally have longer legs. The neutral location of the pedal pivot beams 122 and 126 is moved forwardly by manipulating the adjusting crank 168 to reposition bellcrank 138 and move the neutral position of pedals 130 and 134 farther forward. This allows the taller pilot to be seated comfortably in seat 242 and to comfortably reach pedals 130 and 134, yet have his head 252 at the proper eye reference location 254.

To position a shorter pilot, seat 242 is raised and the neutral position of pedals 130 and 134 is moved rearwardly so the pedals 130 and 134 are at a more convenient upward and rearward location and the pilot's head is again at the proper eye reference location 254.

Figure 12A:
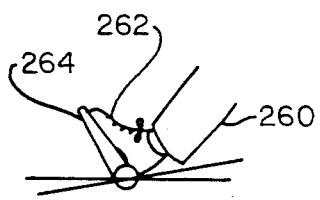
FIGS. 12(a), (b), and (c) are schematic drawings showing three pedal positions for one prior art rudder pedal control.
Figure 12B:
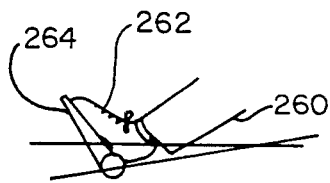
Figure 12C:
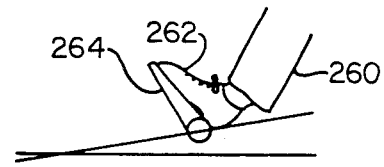
Figure 13A:
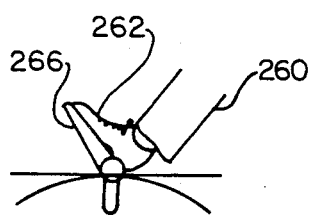
FIGS. 13(a), (b), and (c) are schematic drawings showing three pedal positions for the pedal assembly of another prior art pedal control.
Figure 13B:
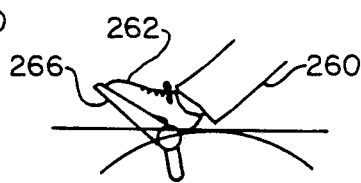
Figure 13C:
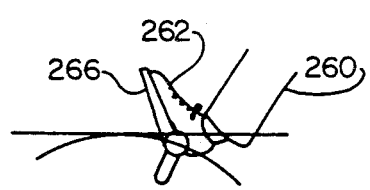
Figure 14A:
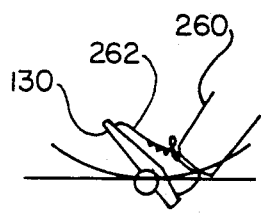
FIGS. 14(a), (b), and (c) are schematic drawings similar to FIGS. 12(a)-(c) and 13(a)-(c) and showing different pedal positions provided for by the present invention.
Figure 14B:
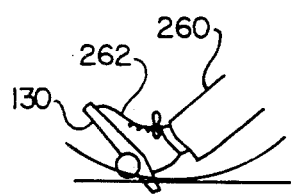
Figure 14C:
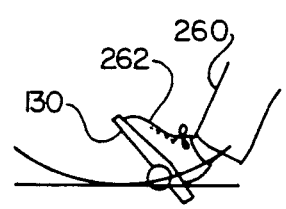

To illustrate the operating convenience and ergometric improvement provided by the present invention, reference is now made to FIGS. 12(a) through 14(c). In FIGS. 12(a) through 12(c), the improvement disclosed in my earlier U.S. Pat. No. 4,470,570 is illustrated. Other prior art seat adjustment devices are illustrated in FIGS. 13(a) through 13(c). The arcuate path of motion provided for pedal adjustment and for pedal input in accordance with the present invention is illustrated in FIGS. 14(a) through 14(c). In all of these figures, a pilot's calf 260 is at an operating location, and his foot 262 is positioned at a resulting angle relative to the calf 260. The level of the heel portion of pedal 264 is shown at an an intermediate location in FIG. 12(a), at an extended position in FIG. 12(b) and at a retracted position in FIG. 12(c). The path of movement provided shown in FIGS. 12(a) through 12(c) is ergometrically superior to the prior arrangement illustrated in FIGS. 13(a) through 13(c) which includes a floor mounted rudder pedal with a downward arcuate path of motion (such pedal 266 is shown at an intermediate position optimal for the average sized pilot). Displacement of pedal 266 would be along an arcuate path which has a moderate downward slant.

In FIG. 13(b), the neutral position of pedal 266 has been moved forwardly. It can be seen that the movement of pedal 266 is now along an arc having a steep, downward, angular path. Also, it can be expected that the taller pilot would have lowered the seat to some extent so that the hip position of the pilot would be lower. Thus the movement of the pilot's leg to depress the pedal would be in a more downward direction and depart from the biomechanically optimal path.

In FIG. 13(c), the pedal 266 has been moved to a further rearward position to accommodate a shorter pilot. In this position, the pilot's foot 262 is angled more sharply upward. Further, it can be expected that the pilot 69 would have raised the seat to obtain proper eye location 254 and may possibly have moved the seat 242 further forward, so that the pilot's calf 260 would be aligned more vertically. This places the pilot's foot 262 in a less comfortable position. Further, the forward movement of the pedal would be in a more upwardly directed path. This would in turn mean that the extension of the pedal 266 would be achieved by a rotation of calf 260 about the knee joint 259 with less downward rotation of the thigh 258. This is also a departure from the optimized movement of the pilot's leg.

FIGS. 14(a) through 14(c) illustrate the upward arcuate path of motion provided by the pedal neutral position adjustment of my present invention. As does the earlier invention illustrated in FIGS. 12(a) through 12(c), my present invention overcomes many of the drawbacks of the pedal adjustment technique illustrated in FIGS. 13(a) through 13(c). Here, pedal 130 is again illustrated, along with pilot's calf 260 and pilot's foot 262. The vertical position for the pivot beams (e.g., 122 and 126) of my present invention is illustrated in FIG. 14(a). Unlike my prior invention illustrated in FIG. 12(b), it can be seen in FIG. 14(b) that, when pedal displacement is forward of the vertical position, the arc of motion rises from the horizontal. This corresponds, in fact, to the situation where the pilot's thigh 258 is lowered to a point of resistance on the horizontal part 244 of the pilot's seat 242, and any further forward extension is accomplished by calf 260 rotating upward at knee 259 as the reader can easily demonstrate.

Not only is a more ergometrically correct arc of motion thus provided at the forward or extended position, but an improved arc of motion is also provided at the rearward position. This is because the upward motion at the rearward position corresponds to a pilot's lifting of his thigh 258 as the leg is retracted, and this is a natural leg motion. Unlike what happens in using my prior invention as illustrated in FIG. 12(c), with my current device the thigh 258 does not have to remain almost level as the angle between calf 260 and foot 264 increases in order to maintain contact with the pedals (e.g., pedal 130) as the pedals are moved to their rearward position. With rearward motion of the pedals, a pilot's thigh 258 may instead be raised, allowing a comfortable leg and ankle position throughout the range of pedal motion.

In summary, I have developed a new control signal generation station for aircraft which: (a) is ergometrically superior to known systems of that character, (b) conserves space, (c) can be modularly installed and serviced, (d) eliminates the necessity for floor or bulkhead penetrations, (e) provides a mechanical linkage between pilot and copilot stations which results in the pedals at both stations being simultaneously displaced to the same extent, and (f) provides independently adjustable, rudder pedal neutral positions for pilots of varying physical dimensions.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. An aircraft utilizing a fly-by-wire control system and having:

a. a yaw control surface;
b. landing gear;
c. brakes;
d. a forward cockpit area with an instrument panel, a forward bulkhead, and a floor;
e. a first pilot station including:
  (i) a first left rudder pedal and a first right rudder pedal and
  (ii) a first right brake actuating mechanism and a first left brake actuating mechanism;
f. a second pilot station including:
  (i) a second left rudder pedal and a second right rudder pedal and
  (ii) a second right brake actuating mechanism and a second left brake actuating mechanism;
g. support means mounting said first left and right rudder pedals and said second left and right rudder pedals for pivotal movement about fixed, transverse, generally horizontal axes;
h. means for converting pivotal displacements of said rudder pedals at each of said pilot stations into electrical signals for direct or indirect transmission to and for control of aircraft yaw control surfaces;
i. means for causing each of said brake actuating mechanisms to provide a linear motion corresponding to a pivotable movement of the corresponding left and right pedals about a movable, transverse, generally horizontal axis;
j. means for converting the linear motions provided by said brake actuating mechanisms into electrical signals for direct or indirect transmission to and for control of the aircraft brakes; and
k. means for converting said pivotable displacements of said rudder pedals into electrical signals for direct or indirect transmission to said landing gear for directional control of said aircraft;
l. the support means of each pilot station having a structural frame, said structural frame including attachment means and said attachment means being adapted to suspend said structural frame and the pilot station in which that frame is incorporated:
  (i) from the underside of said instrument panel,
  (ii) above said cockpit floor, and
  (iii) rearward of said forward bulkhead, to thereby:
  (iv) eliminate the need for space below the cockpit floor for components of the several converting means in the pilot station, and
  (v) eliminate the requirement for floor and bulkhead penetration in the installation of the pilot station.

2. An aircraft as defined in claim 1, wherein said brake actuating mechanism include:
a. a first left brake crank and a first right brake crank at said first pilot station;
b. a second left brake crank and a second right brake crank at said second pilot station;
c. each of said brake cranks so being mounted as to extend from the front toward the rear of the cockpit area and each said crank being pivotable at one end thereof about a fixed, transverse, generally horizontal axis;
d. a first left tension rod mechanism and a first right tension rod mechanism in said first pilot station;
e. a second left tension rod mechanism and a second right tension rod mechanism in said second pilot station; and
f. each of said tension rod mechanisms being operatively connected to an associated rudder pedal and each tension rod mechanism also being operably connected to a corresponding brake crank for effecting a pivotable displacement of said corresponding brake crank in response to a force being applied to said corresponding rudder pedal to rotate that pedal about the corresponding, movable, transverse, generally horizontal axis.

3. An aircraft as defined in claim 2, further including:
a. a left brake torque tube means, said left brake torque tube means extending between said first and second left brake cranks;
b. a right brake torque tube means, said right brake torque tube means extending between said first and second right brake cranks;
c. said left brake torque tube means being operatively connected between said first and second left brake cranks;
d. said right torque tube means being operatively connected between said first and second right brake cranks;
e. the operative connections being such that displacement of either said first or said second left brake crank in response to pivotable displacement of a rudder pedal operatively connected to the corresponding brake crank will effect displacement of the left torque tube means, thereby causing displacement of the opposite left brake crank and causing rotation of the opposite rudder pedal an amount equal to displacement of the rudder pedal that a pilot is then manipulating to provide a braking control input; and
f. the operative connections also being so made that displacement of either said first or said second right brake crank in response to pivotable displacement of a rudder pedal operatively connected to the corresponding brake crank will effect displacement of the right torque tube means, thereby causing displacement of the opposite right brake crank and causing rotation of the opposite rudder pedal in an amount equal to the displacement of the rudder pedal that a pilot is then manipulating to provide a braking control input.

4. An aircraft as defined in claim 1, wherein said first pilot station and said second pilot station each include an assembly for adjusting the neutral positions of the pedals at that station, said assembly comprising:
a. a summing bellcrank;
b. a jackshaft assembly for adjusting said summing bellcrank;
c. linkage means independently connecting said right and left pedals to the associated summing bellcrank; and
d. a pilot operable adjustment crank so operatively connected to said jackshaft assembly as to provide adjustment of said summing bellcrank that a pilot may adjust the neutral position of said pedals in a fore-and-aft direction and thereby provide for comfortable operation of said pedals.

5. An aircraft as defined in claim 4, wherein each of said pilot stations further comprises:
a. a feel and control crank;
b. a reaction rod means; and
c. a reaction shaft housing;
d. said summing bellcrank and said feel and control crank being so assembled to said summing bellcrank as to move as a rotatable assemblage about said reaction rod means;

e. said reaction rod means extending downwardly from said reaction shaft housing;
f. said reaction shaft housing being securely attached to said structural frame; and
g. said rotatable assemblage being so secured on said reaction rod means that, when a pilot displaces said left pedal or said right pedal, said displacement is transmitted to said rotatable assemblage by said left linkage means and said right linkage means, whereby, in response to said displacement, said assemblage rotates about said reaction shaft, thereby causing said means for converting displacement into yaw control signals and said feel and control unit to be displaced an amount proportional to the displacement of said pedals by said pilot.

6. An aircraft as defined in claim 5, further including a yaw control feel and centering unit in each of said pilot stations.

7. An aircraft as defined in claim 5, further including a yaw control viscous damper in each of said pilot stations.

8. An aircraft as defined in claim 1, wherein the means in each of said pilot stations for converting linear motion of brake actuating mechanisms into electrical signals further includes a feel spring.

9. An aircraft as defined in claim 1, wherein the means in each of said pilot stations for converting linear motion of the brake actuating mechanism into electrical signals includes a viscous damper.

10. An aircraft utilizing a fly-by-wire control system and having:
a. a yaw control surface;
b. landing gear;
c. brakes;
d. a forward cockpit area with an instrument panel, a forward bulkhead, and a floor;
e. a first pilot station including:
  (i) a first left rudder pedal and a first right rudder pedal and
  (ii) a first right brake actuating mechanism and a first left brake actuating mechanism;
f. a second pilot station including:
  (i) a second left rudder pedal and a second right rudder pedal and
  (ii) a second right brake actuating mechanism and a second left brake actuating mechanism;
g. support means mounting said first left and right rudder pedals and said second left and right rudder pedals for pivotal movement about fixed, transverse, generally horizontal axes;
h. means for converting pivotal displacements of said rudder pedals into electrical signals for direct or indirect transmission to and for control of aircraft yaw control surfaces;
i. means for causing each of said brake actuating mechanisms to provide a linear motion corresponding to a pivotable movement of the corresponding left and right pedals about a movable, transverse, generally horizontal axis;
j. means for converting the linear motions provided by said brake actuating mechanisms into electrical signals for direct or indirect transmission to and for control of the aircraft brakes;
k. means for converting said pivotable displacements of said rudder pedals into electrical signals for direct or indirect transmission to said landing gear for directional control of said aircraft; and
l. means, in each of said first and second pilot stations, for independent forward and rearward adjustment of the neutral positions of said left and right rudder pedals to thereby accommodate pilots with different physical dimensions;
m. said first pilot station and said second pilot station each including an assembly for adjusting the neutral positions of the rudder pedals at that station, said assembly comprising:
  (i) a summing bellcrank,
  (ii) a jackshaft assembly for adjusting said summing bellcrank,
  (iii) linkage means independently connecting said right and left rudder pedals to the associated summing bellcrank,
  (iv) a pilot operable adjustment crank so operatively connected to said jackshaft assembly as to provide adjustment of said summing bellcrank in a manner that a pilot may employ to adjust the neutral positions of said pedals in a fore-and-aft direction and thereby provide for comfortable operation of said pedals,
  (v) a feel and control crank,
  (vi) a reaction rod means, and
  (vii) a reaction shaft housing,
  (viii) said summing bellcrank and said feel and control crank being so assembled as to move as a rotatable assemblage about said reaction rod means,
  (ix) said reaction rod means extending downwardly from said reaction shaft housing,
  (x) said reaction shaft housing being securely attached to said support means, and
  (xi) said rotatable assemblage being so secured on said reaction rod means that, when a pilot displaces said left pedal or said right pedal, said displacement is transmitted to said rotatable assemblage by said left linkage means and said right linkage means, whereby, in response to said displacement, said assemblage rotates about said reaction shaft, thereby causing said means for converting displacement into yaw control signals and said feel and control crank to be displaced an amount proportional to the displacement of said pedals by said pilot.

11. An aircraft as defined in claim 10, further including a yaw control feel and centering unit in each of said pilot stations.

12. An aircraft as defined in claim 10, further including a yaw control viscous damper in each of said pilot stations.

13. An aircraft utilizing a fly-by-wire control system and having:
a. a yaw control surface;
b. landing gear;
c. brakes;
d. a forward cockpit area with an instrument panel, a forward bulkhead, and a floor;
e. a first pilot station including:
  (i) a first left rudder pedal and a first right rudder pedal and
  (ii) a first right brake actuating mechanism and a first left brake actuating mechanism;
f. a second pilot station including:
  (i) a second left rudder pedal and a second right rudder pedal and
  (ii) a second right brake actuating mechanism and a second left brake actuating mechanism;

g. support means mounting said first left and right rudder pedals and said second left and right rudder pedals for pivotal movement about fixed, transverse, generally horizontal axes;

h. means for converting pivotal displacement of said rudder pedals at each of said pilot stations into electrical signals for direct or indirect transmission to and for control of aircraft yaw control surfaces;

i. means for causing each of said brake actuating mechanisms to provide a linear motion corresponding to a pivotable movement of the corresponding left and right pedals about a movable, transverse, generally horizontal axis;

j. means for converting the linear motions provided by said brake actuating mechanisms into electrical signals for direct or indirect transmission to and for control of the aircraft brakes;

k. means for converting said pivotable displacements of said rudder pedals into electrical signals for direct or indirect transmission to said landing gear for directional control of said aircraft; and l. means, in each of said first and second pilot stations, for independent forward and rearward adjustment of the neutral positions of said left and right rudder pedals to thereby accommodate pilots with different physical dimensions;

m. the support means of each pilot station having a structural frame, said structural frame including attachment means and said attachment means being adapted to suspend said structural frame and the pilot station in which that frame is incorporated:
  (i) from the underside of said instrument panel,
  (ii) above said cockpit floor, and
  (iii) rearward of said forward bulkhead, to thereby:
  (iv) eliminate the need for space below the cockpit floor for components of the several converting means in the pilot station, and
  (v) eliminate the requirement for floor and bulkhead penetration in the installation of the pilot station.

14. An aircraft as defined in claim 13, wherein the means in each of said pilot stations for converting linear motion of the brake actuating mechanism in that station into electrical signals includes a viscous damper.

15. For use in an aircraft having a pilot seat, an instrument panel, a rudder, a nose gear steering system, and brakes, a unitized control assembly which is adapted to be positioned in front of said seat and beneath said instrument panel, said control assembly comprising:

a. a frame having two pairs of spaced apart, generally forwardly extending supports interconnected at the forward portion of said frame by a transversely extending support;

b. an assembly attachment means at the top of said frame for suspending said control assembly below said instrument panel;

c. a pair of downwardly extending, right and left beams mounted at their upper ends for independent pivotable movement about a common, transverse, generally horizontal axis;

d. a pair of foot-operated pedals, each fixed to one of said downwardly extending beams;

e. adjustment means for so pivotally moving said pedal beams as to place the neutral positions in a location affording safe and comfortable operation of said pedals by a seated aircraft pilot;

f. means for generating electronic signals for controlling said rudder, said nose gear steering system, and said brakes;

g. linkage means for so operationally connecting said pedals to said signal generating means that displacement of a pedal will result in a control signal being generated, said linkage means including a summing bellcrank and two pairs of elongated, generally upwardly extending rods;

h. a lower end of each rod in said first pair being so connected to said pedals that said first rod pair moves either upwardly or downwardly depending on the direction of pedal rotational movement and thereby translates said movement of said pedals to that signal generation means which generates the signal for controlling said brakes;

i. the upper ends of the rods of said second pair being so connected to said pedal beams that said second rods translate forwardly and rearwardly in the direction of pedal displacement;

j. the lower ends of the rods of said second pair being connected to a summing bellcrank;

k. there being two arms on said summing bellcrank, one for each of the rods of said second rod pair;

l. said bellcrank being pivotally connected to said control assembly frame for rotation about a vertically extending axis;

m. a lower end of each rod in said second rod pair being so connected to one of the arms of said bellcrank that translational movement of either one of said second rods will cause said bellcrank to pivot about said vertically extending axis; and n. the lower ends of the rods of said second rod pair being so connected to the associated bellcrank and said bellcrank being so connected to said pedal neutral position adjustment means that said second rod pair effects a change in the neutral position of said left and right beams in response to manipulations of said adjustment means.

16. A control assembly as defined in of claim 15, wherein said adjustment means comprises a pilot-operated jackscrew so connected to said summing bellcrank that rotation of said jackscrew results in a concomitant rotation of said bellcrank.

17. A control assembly as defined in claim 15 which has a yaw control feel and centering unit.

18. A control assembly as defined in of claim 15 which has a yaw control viscous damper.

19. A control assembly as defined in claim 15, wherein said linkage includes left and right, brake feel springs.

20. A control assembly as defined in claim 15, wherein said linkage means includes left and right brake viscous dampers.

21. A unitized aircraft yaw, brake, and landing gear steering assembly comprising:

a. a support;

b. depending right and left beams fixed at their upper ends to said support for independent pivotable movement relative thereto about a common, transverse, generally horizontal axis;

c. right and left pedals;

d. means fixing said pedals to the lower ends of said depending beams for rotational movement relative thereto about horizontal transverse axes;

e. a first transducer means for converting rotational movement of said left pedal into electrical left braking signals proportional in magnitude to the magnitude of the rotational displacement of said left pedal;

f. a second transducer means for converting rotational movement of said right pedal into electrical right braking signals proportional in magnitude to the magnitude of the rotational displacement of said right pedal; and g. a third transducer means for converting pivotable displacements of said beams about said common axis into electrical yaw control signals proportional in magnitude to the displacements of said beams about said common axis.

22. An assembly as defined in claim 21 which further comprises:

a. a summing bellcrank;
b. a jackshaft assembly for effecting a displacement of said summing bellcrank;
c. a pilot-operable means so operatively connected to said jackshaft assembly that manipulation of said pilot-operable means will result in a displacement of said bellcrank; and
d. means so connecting said bellcrank to said right and left pedals that a displacement of said bellcrank as aforesaid will result in a fore-or-aft relocation of the neutral axes of the pedals, whereby a pilot may, by manipulation of the pilot-operable means, adjust the neutral positions of said pedals in a fore-and-aft direction and thereby position said pedals for safe and comfortable operation with no, or only a minimal, fore-or-aft adjustment of the pilot's seat.

23. An assembly as defined in claim 21 which also includes a structural frame for housing said support, said structural frame including attachment means, said attachment means being located above said support means, and said attachment means being adapted to support said assembly;

a. from the underside of the instrument panel of an aircraft in which said assembly is installed;
b. above the cockpit floor of the aircraft, and
c. rearward of the forward cockpit bulkhead to thereby:
d. eliminate the need for space below the cockpit floor for components of said assembly, and
e. reduce the requirement for floor and bulkhead penetration in said cockpit.

24. A unitized yaw and brake control assembly for an aircraft having an instrument panel and a floor at the station in the cockpit of the aircraft where said assembly is located, said assembly comprising:

a. an overhead support;
b. right and left pedals;
c. first transducer means for converting pivotable displacements of said pedals about parallel first axes to yaw controlling signals proportional in magnitude to said displacements of said pedals; and
d. second transducer means for converting pivotable displacements of said right pedal about a second axis to right brake controlling signals proportional in magnitude to the displacement of said right pedal about said second axis;
e. third transducer means for converting pivotable displacements of said left pedal means about a third axis to left brake controlling signals proportional in magnitude to the displacement of said left pedal about said third axis; and
f. means for supporting said pedals and said transducer means solely from said overhead support.

25. A control assembly as defined in claim 24, further comprising:

a. a summing bellcrank;
b. a jackshaft assembly for displacing said summing bellcrank;
c. a pilot-operable adjustment means so operatively connected to said jackshaft assembly that manipulation of the pilot-operable adjustment means by a pilot will effect a displacement as aforesaid of said summing bellcrank; and
d. means so connection said bellcrank to said right and left pedals that a displacement of said summing bellcrank as aforesaid will result in a fore-or-aft relocation of said pedals, whereby a pilot may, by manipulation of the pilot-operable adjustment means, adjust the neutral position of said pedals in a fore-and-aft direction and thereby position said pedals at a safe and comfortable operating position with no, or only a minimal, fore-or-aft adjustment of the pilot's seat.

26. A control assembly as defined in claim 24 which further includes a structural frame, said structural frame including attachment means, said attachment means being located above said support, and said attachment means being adapted to suspend said frame and the control assembly in which that frame is incorporated:

a. from the underside of the instrument panel of an aircraft;
b. above the floor of the cockpit of the aircraft in which the control assembly is installed; and
c. to the rear of the forward cockpit bulkhead to thereby:
d. eliminate the need for space below the cockpit floor for components of the control assembly signal generation station, and
e. reduce the requirement for floor and bulkhead penetration in said cockpit.

27. An aircraft utilizing a fly-by-wire control system and having:

a. a yaw control surface;
b. landing gear;
c. brakes;
d. a forward cockpit area with an instrument panel, a forward bulkhead, and a floor;
e. a first pilot station including:
  (i) a first left rudder pedal and a first right rudder pedal and
  (ii) a first right brake actuating mechanism and a first left brake actuating mechanism;
f. a second pilot station including:
  (i) a second left rudder pedal and a second right rudder pedal and
  (ii) a second right brake actuating mechanism and a second left brake actuating mechanism;
g. support means mounting said first left and right rudder pedals and said second left and right rudder pedals for pivotal movement about fixed, transverse, generally horizontal axes;
h. means for converting pivotal displacements of said rudder pedals at each of said pilot stations into electrical signals for direct or indirect transmission to and for control of aircraft yaw control surfaces;
i. means for causing each of said brake actuating mechanisms to provide a linear motion corresponding to a pivotable movement of the corresponding left and right pedals about a movable, transverse, generally horizontal axis;

j. means for converting the linear motions provided by said brake actuating mechanisms into electrical signals for direct or indirect transmission to and for control of the aircraft brakes;

k. means for converting said pivotable displacements of said rudder pedals into electrical signals for direct or indirect transmission to said landing gear for directional control of said aircraft; and l. means in each of said first and second pilot stations for independent forward and rearward adjustment of the neutral positions of said left and right rudder pedals to thereby accommodate pilots with different physical dimensions;

m. said brake actuating mechanisms including:
  (i) a first left brake crank and a first right brake crank at said first pilot station and a second left brake crank and a second right brake crank at said second pilot station, each of said brake cranks so being mounted as to extend from the front toward the rear of the cockpit and each said crank being pivotable at one end thereof about a fixed, transverse, generally horizontal axis;
  (ii) a first left tension rod mechanism and a first right tension rod mechanism in said first pilot station and a second left tension rod mechanism and a second right tension rod mechanism in said second pilot station, each of said tension rod mechanisms being operatively connected to an associated rudder pedal and each tension rod mechanism also being operably connected to a corresponding brake crank for effecting a pivotable displacement of said corresponding brake crank in response to a force being applied to said corresponding rudder pedal to rotate that pedal about the corresponding, movable, transverse, generally horizontal axis;
  (iii) a left brake torque tube means, said left brake torque tube means extending between said first and second left brake cranks;
  (iv) a right brake torque tube means, said right brake torque tube means extending between said first and second right brake cranks;
  (v) said left brake torque tube means being operatively connected between said first and second left brake cranks and said right torque tube means being operatively connected between said first and second right brake cranks;
  (vi) the operative connections being such that displacement of either said first or said second left brake crank in response to pivotable displacement of a rudder pedal operatively connected to the corresponding brake crank will effect displacement of the left torque tube means, thereby causing displacement of the opposite left brake crank and causing rotation of the opposite rudder pedal an amount equal to the displacement of the rudder pedal that a pilot is then manipulating to provide a braking control input; and
  (vii) the operative connections also being so made that displacement of either said first or said second right brake crank in response to pivotable displacement of a rudder pedal operatively connected to the corresponding brake crank will effect displacement of the right torque tube means, thereby causing displacement of the opposite right brake crank and causing rotation of the opposite rudder pedal in an amount equal to the displacement of the rudder pedal that a pilot is then manipulating to provide a braking control input.

* * * * *